(12) United States Patent
Kimmel

(10) Patent No.: US 7,563,982 B2
(45) Date of Patent: Jul. 21, 2009

(54) BUS BAR ASSEMBLY

(75) Inventor: Joseph S. Kimmel, Carleton, MI (US)

(73) Assignee: Continental Automotive Systems US, Inc., Auburn Hills ( * ) Notice: Subject to any disclaimer, the term of this patent is extended or adjusted under 35 U.S.C. 154(b) by 90 days.

(21) Appl. No.: 11/565,556

(22) Filed: Nov. 30, 2006

(65) Prior Publication Data
US 2008/0128150 A1 Jun. 5, 2008

(51) Int. Cl.
*H02G 5/00* (2006.01)
(52) U.S. Cl. .................. 174/72 B; 174/99 B; 174/71 B; 174/88 B; 174/133 B; 439/517; 439/212; 361/611
(58) Field of Classification Search ............... 174/70 B, 174/99 B, 133 B, 149 B, 71 B, 88 B, 95, 174/72 B; 439/517, 212, 114, 115; 361/611, 361/614, 615, 811
See application file for complete search history.

(56) References Cited

U.S. PATENT DOCUMENTS

| | | | | | |
|---|---|---|---|---|---|
| 3,189,680 | A | * | 6/1965 | Stanback | 174/88 B |
| 4,236,046 | A | * | 11/1980 | DeVries | 174/72 B |
| 4,266,091 | A | * | 5/1981 | Fukuda | 174/72 B |
| 4,677,523 | A | | 6/1987 | Kauppi | |

FOREIGN PATENT DOCUMENTS

| | | |
|---|---|---|
| JP | 09-308267 | 11/1997 |
| JP | 11-055938 | 2/1999 |
| JP | 2005-237118 | 9/2005 |

* cited by examiner

*Primary Examiner*—Dhiru R Patel

(57) ABSTRACT

A bus bar assembly includes a first bus bar having at least first and second mounting arms and a second bus bar having at least third and fourth mounting arms. The first and third mounting arms are adapted to alternately interleave with one another such that the position of the first mounting arm relative to the third mounting arm is opposite as to the position of the second mounting arm relative to the fourth mounting arm.

12 Claims, 10 Drawing Sheets

US 7,563,982 B2

BUS BAR ASSEMBLY

BACKGROUND OF THE INVENTION

1. Field of the Invention

The present disclosure relates to bus bar assemblies.

2. Description of the Related Art

Bus bars are structures that electrically couple electrical elements, such as capacitors and solid state devices, in an electric circuit.

As is well known in the art, any electric current may have an associated magnetic field. The magnitude of the associated magnetic field is proportional to the magnitude of the current. In a uniform material, the magnitude of the magnetic field is also proportional to the inverse of the square of the distance from the current. The direction of the magnetic field is perpendicular to the direction of current.

Where the current changes as a function of time, the associated magnetic field may also change as a function of time. A changing magnetic field may in turn produce a changing magnetic flux. A changing magnetic flux may induce an emf in a circuit. The magnitude of the induced electromagnetic field (emf) is directly proportional to the time rate of change of the magnetic flux as given by the following equation:

$$\text{emf} = N \frac{d\Phi_m}{dt}$$

where N is the number of turns of wire in an inductor (which may be equal to 1 for a bus bar), $\Phi_m$ is the magnetic flux and t is time.

An induced emf may be undesirable in an electric circuit as it may damage electrical circuit elements. Therefore, as given by the above equation, to reduce undesirable induced emfs, one may seek to reduce the changing magnetic flux.

One method of reducing the changing magnetic flux at a particular point is to geometrically arrange current carrying elements so that their associated magnetic fields are of equal magnitude and aligned in opposite directions. One way to do this is to arrange current carrying elements in a substantially parallel, proximate orientation where their currents run in opposite orientations. This is a technique known in the art.

Industrial capacitors are often physically large as compared to other electric circuit elements. Simply due to their size, shape and physical design, it has heretofore been difficult to arrange multiple capacitors so as to reduce the magnetic flux in the manner described above. Capacitors are of particular concern because a discharging capacitor may produce a very high current that varies at an extremely rapid rate inducing a very large emf that may damage other elements in the circuit. For example, the current in a discharging commercially available capacitor may change from 140 A to 28 A in 100 nanoseconds yielding an extremely high rate of change of 1,120,000 A per second. FIG. 1 shows a graph of current versus time for a discharging commercially available capacitor.

Apparatus in the art have attempted to arrange multiple capacitors with bus bar structures so as to reduce magnetic flux and induced emfs however, such apparatus do not reduce the net magnetic flux to a sufficient degree. Japanese Patent Application No.: 2004043398, for example, aligns single pairs of bus bar mounting arms proximate and parallel to one another. Japanese Patent Application No.: 08142168, as another example, aligns multiple pairs of bus bar mounting arms but offsets the mounting arms along their length such that they are not proximate over their lengths.

Others have addressed the problem of induced emf in another fashion and have not attempted to reduce magnetic flux but instead, have opted to design robust electric circuits so as to avoid damage. Apparatus known in the art that are robust include insulated gate bipolar transistors (IGBT). IGBTs are rated for such higher voltages and have tolerance of such voltage overloads and have been used, for example, in hybrid gasoline electric automobiles. IGBTs unfortunately, are expensive and have high losses.

Therefore, there remains a need in the art for a compact, inexpensive bus bar structure that has the effect of reducing an associated magnetic flux. The embodiments disclosed herein address these needs and provide associated benefits.

BRIEF SUMMARY OF THE INVENTION

A bus bar assembly is disclosed comprising first and second bus bars. The first bus bar has a first and second mounting arm. The second bus bar has a third and fourth mounting arm. The first and third mounting arms are adapted to alternately interleave with one another such that the position of the first mounting arm relative to the third mounting arm is opposite as to the position of the second mounting arm relative to the fourth mounting arm.

The mounting arms may be adapted for coupling to electrical elements which may be capacitors. The first bus bar may have a first electrical polarity and the second bus bar may have a second electrical polarity.

In one embodiment, one bus bar has a passage adapted to receive a mounting arm of the opposing bus bar.

In another embodiment, one mounting arm has a notch to allow an opposing mounting arm of the opposing bus bar to pass.

In another embodiment, the bus bars have bases that are aligned substantially parallel and proximate to one another.

BRIEF DESCRIPTION OF THE SEVERAL VIEWS OF THE DRAWING(S)

In the figures, identical reference numbers identify similar elements or acts. The sizes and relative positions of elements in the figures are not necessarily drawn to scale and some of these elements are arbitrarily enlarged and positioned to improve figure legibility. Further, the particular shapes of the elements as drawn are not intended to convey any information regarding the actual shape of the particular elements, and have been solely selected for ease of recognition in the figures.

DETAILED DESCRIPTION OF THE INVENTION

In the following description, certain specific details are set forth in order to provide a thorough understanding of various embodiments. However, one skilled in the art will understand that the invention may be practiced without these details. In other instances, well-known structures have not been shown or described in detail to avoid unnecessarily obscuring descriptions of the embodiments.

Unless the context requires otherwise, throughout the specification and claims which follow, the word "comprise" and variations thereof, such as, "comprises" and "comprising" are to be construed in an open, inclusive sense, that is as "including, but not limited to."

The headings provided herein are for convenience only and do not interpret the scope or meaning of the claimed invention.

Reference throughout this specification to "one embodiment" or "an embodiment" means that a particular feature, structure or characteristic described in connection with the embodiment is included in at least one embodiment. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

In one embodiment, a bus bar assembly is comprised of a first and second bus bar. The first bus bar has a first and second mounting arm. The second bus bar has a third and fourth mounting arm. The first and third mounting arms are adapted to alternately interleave with one another such that the position of the first mounting arm relative to the third mounting arm is opposite as to the position of the second mounting arm relative to the fourth mounting arm.

Figure 2:
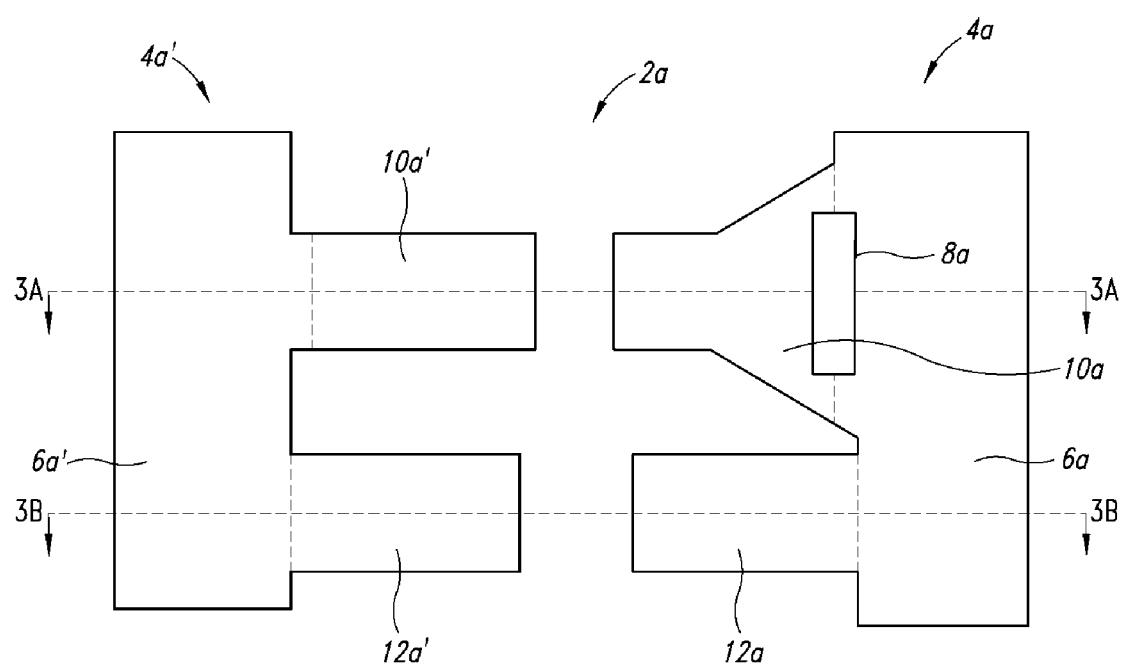
FIG. 2 is an exploded view showing two bus bars for use in forming a bus bar assembly, according to an illustrated embodiment.

FIG. 2 shows an exploded view of one embodiment where a bus bar assembly 2a comprises bus bars 4a, 4a'. Bus bar 4a has a base 6a, a passage 8a and mounting arms 10a, 12a. Bus bar 4a' has a base 6a' and mounting arms 10a', 12a'. Passage 8a is adapted to receive mounting arm 10a' and mounting arm 10a' is likewise adapted to feed through passage 8a without contacting or electrically shorting to the base 6a.

When the embodiment depicted in FIG. 2 is assembled, mounting arms 10a, 10a' are alternately interleaved with one another such that the position of mounting arm 10a relative to mounting arm 10a' is opposite relative as to the position of mounting arm 12a relative to mounting arm 12a'. Vertically extending broken lines in FIG. 2 represent locations where bends or angles in the bus bar assembly 2a will be formed for purposes of assembly. The precise locations of such bends or angles may be chosen so as to position the mounting arms 10a, 12a, 10a', 12a' in a particular position or orientation with respect to an external apparatus (not shown) or with respect to each other, for a particular application, for example.

Figure 3A:
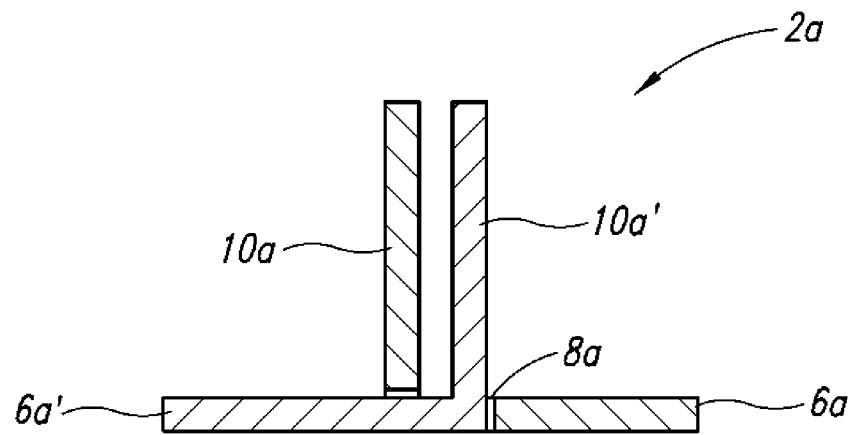
FIG. 3A is a cross-sectional view of a bus bar assembly formed from the two bus bars of FIG. 2 taken along line 3A-3A.
Figure 3B:
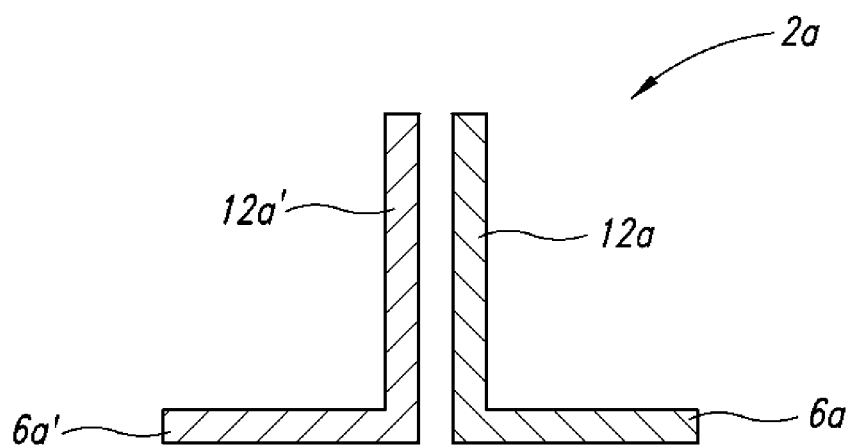
FIG. 3B is a cross-sectional view a bus bar assembly formed from the two bus bars of FIG. 2 taken along line 3B-3B.

FIG. 3A shows a cross-sectional view taken along line 3A-3A of the bus bar assembly 2a of FIG. 2 where mounting arms 10a, 10a', 12a, 12a' have been bent or angled upward and assembled. FIG. 3A illustrates the spatial relationship between the mounting arms 10a, 10a'. FIG. 3B shows a cross-sectional view taken along line 3B-3B of the bus bar assembly 2a where mounting arms 10a, 10a', 12a, 12a' have been bent or angled upward and assembled. FIG. 3B illustrates the spatial relationship between the mounting arms 12a, 12a'. In FIG. 3A, mounting arm 10a' has been fed through passage 8a such that the mounting arms 10a, 10a' are alternately interleaved. In addition, the position of mounting arm 10a relative to mounting arm 10a' is opposite relative as to the position mounting arm 12a relative to mounting arm 12' as shown in FIG. 3B.

In operation, the first bus bar 4a may have a first electrical polarity and the second bus bar 4a' may have a second electrical polarity. For example, the first bus bar 4a may have a high side electrical polarity or a low side electrical polarity. As a further example, the bus bars 4a, 4a' may have any associated phase or have multiple associated phases. Therefore, the embodiment shown in FIG. 2 when assembled (as depicted in FIGS. 3A and 3B) allows mounting arms of different polarity to be substantially parallel and proximate to one another. For example, mounting arms 10a and 12a' may be substantially parallel and proximate one another, and mounting arm 12a and 10a' may be substantially parallel and proximate one another.

The mounting arms 10a, 12a, 10a', 12a' may be adapted for coupling to electrical elements such as capacitors, for example, or other electric circuit elements.

Figure 1:
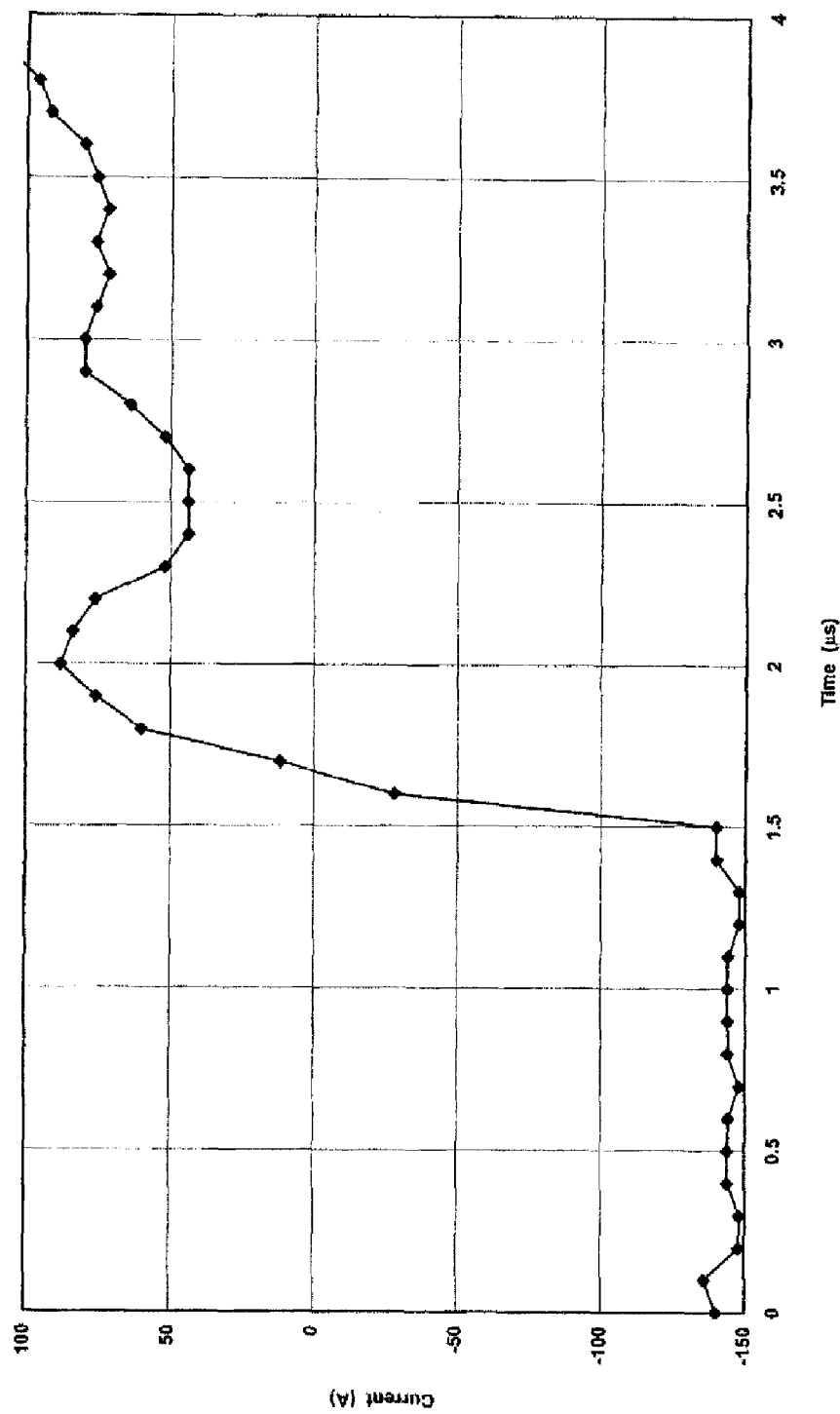
FIG. 1 is a graph showing current versus time for a discharging capacitor from the prior art.
Figure 4:
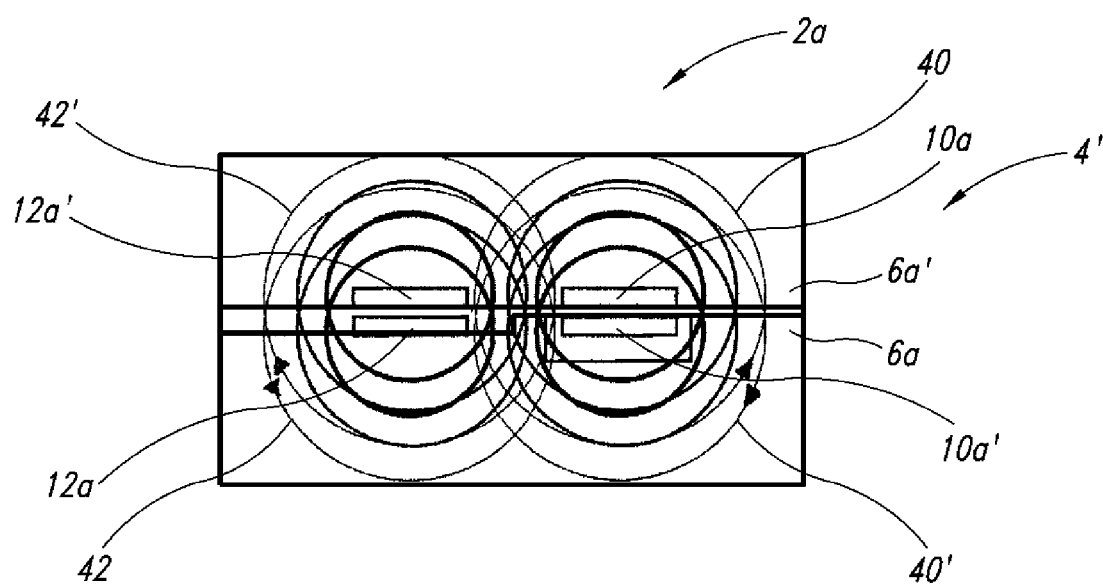
FIG. 4 is a top plan view of the bus bar assembly formed from the two bus bars of FIG. 2, illustrating approximate magnetic field lines.

FIG. 4 shows a plan view of the bus bar assembly 2a of FIG. 1 in an assembled state showing a simplified depiction of magnetic field lines 40, 42, 40', 42' associated with the currents in mounting arms 10a, 12a, 10a', 12a', respectively, (electrical elements coupled to mounting arms 10a, 12a, 10a', 12a' are not shown). Thicker lines indicate areas of magnetic field of greater magnitude and arrows indicate the direction of the magnetic field. In such a configuration, the magnetic field associated with any current though mounting arms 10a, 10a' may have a canceling effect on one another (as the currents in mounting arms 10a, 10a' may have substantially equal magnitudes and mounting arms 10a, 10a' are proximate and substantially parallel). Likewise, the magnetic field associated with any current though mounting arms 12a, 12a' may also have a canceling effect on one another. Furthermore, the magnetic field associated with any current though mounting arms 10a, 12a' and 12a, 10a' may also have a canceling effect on one another. Where the magnetic fields tend to cancel one another out, the net magnetic flux may substantially reduce any induced emf, protecting electrical circuit elements.

The material of manufacture of the bus bar assembly 2a is not essential to the various embodiments and can be selected based on the particular application. For example, materials for manufacture of the bus bar assembly 2a may include conductive materials, for instance, copper, gold and/or aluminum. The bus bar assembly 2a, for example, may be manufactured using a number of planar strips or hollow tubes to reduce the so-called skin effect, well known in the art, if desired.

The length, thickness and shape of the bases 6a, 6a' and the mounting arms 10a, 12a, 10a', 12a' are not essential, and may be adapted for a particular application. For example, the bus bar assembly 2a may employ longer mounting arms to accommodate larger electrical elements that may be coupled thereto. For example, industrial capacitors may require the mounting arms 10a, 12a, 10a', 12a' to accommodate their physically large size. The thickness and shape of the mounting arms 10a, 12a, 10a', 12a' may be such as to allow for maximum current flow required for a particular application as desired.

The size and shape of passage 8a is not essential, provided it is adapted to receive mounting arm 10a' without contact or electrical shorting. For example, the passage 8a may comprise a slot where the mounting arm 10a' is manufactured from strips of material or the passage 8a may comprise a hole where the mounting arm 10a' is manufactured out of a tube of material.

Figure 5:
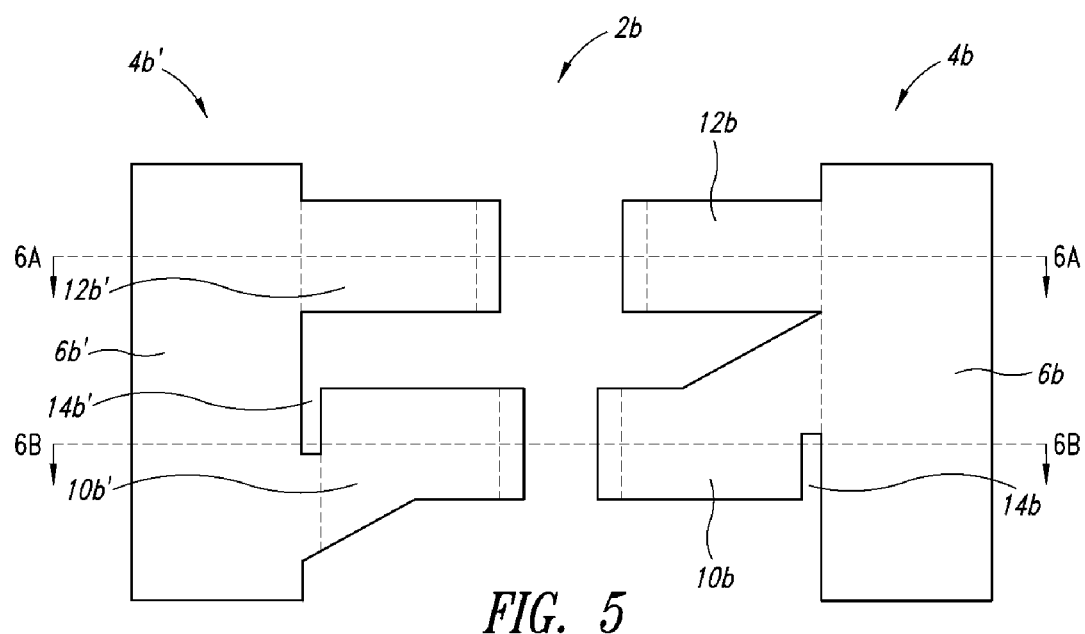
FIG. 5 is an exploded view showing two bus bars for use in forming a bus bar assembly, according to another illustrated embodiment.

FIG. 5 shows another embodiment of a bus bar assembly 2b in which one or more mounting arms have a notch to allow a respective opposing mounting arm to pass. In particular, FIG. 5 is an exploded view of a first bus bar 4b and second bus bar 4b' that are used to form a bus bar assembly 2b. The positions of bends or angles to be formed in the first and the second bus bars 4b, 4b', are indicated by the vertically extending broken lines in FIG. 5. In particular, the first mounting arm 10b has a notch 14b formed near the base 6b. To further facilitate first mounting arm 10b to pass by or around mounting arm 10b', the mounting arm 10b' may have a notch 14b' near the base 6b', if desired, as depicted in FIG. 5. The second mounting arms 12b, 12b' do not have a notch.

Figure 6A:
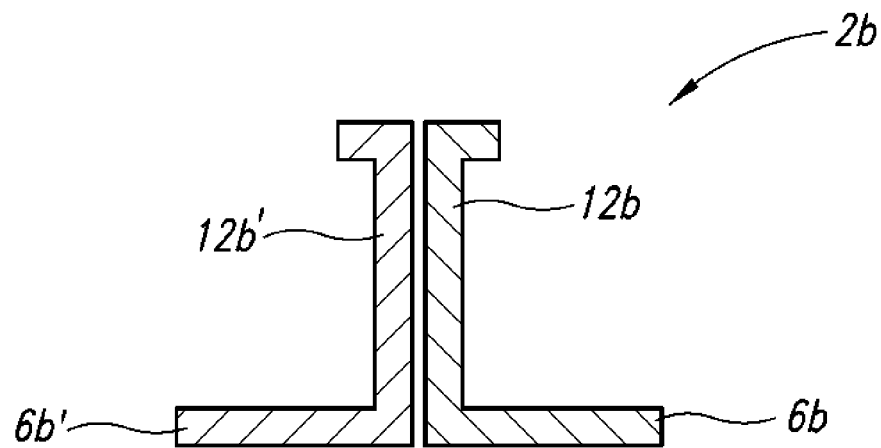
FIG. 6A is a cross-sectional view of a bus bar assembly formed from the two bus bars of FIG. 5 taken along line 6A-6A.
Figure 6B:
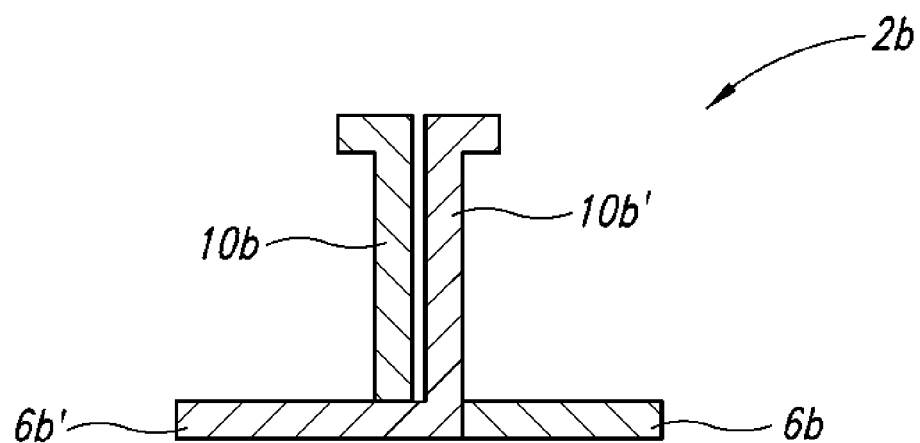
FIG. 6B is a cross-sectional view of the bus bar assembly formed from the two bus bars of FIG. 5 taken along line 6B-6B.

FIG. 6A is a cross-sectional view of the assembled bus bar assembly 2b formed from the bus bars 4b, 4b' of FIG. 5 taken along line 6A-6A, where mounting arms 12b, 12b' have been bent or angled upward and assembled. FIG. 6A illustrates the spatial relationship between the second mounting arms 12b, 12b'. FIG. 6B is a cross-sectional view of the assembled bus bar assembly 2b formed from the bus bars 4b, 4b' of FIG. 5 taken along line 6b-6b where mounting arms 10b, 10b' have been bent or angled upward and assembled. FIG. 6B illustrates the spatial relationship between the mounting arms 10b, 10b'. The mounting arms 10b, 10b' have been passed around each other via notches 14b, 14b' such that the position of the mounting arm 10b relative to the mounting arm 10b' (best illustrated in FIG. 6A) is opposite relative to the position of the mounting arm 12b relative to the mounting arm 12b' (best illustrated in FIG. 6B).

FIGS. 5, 6A and 6B also show the mounting arms 10a, 10b, 12a, 12b, 10a', 10b', 12a', 12b' adapted for coupling to electrical elements such as capacitors, for example, by way of further bends in the mounting arms. The mounting arms 10a, 10b, 12a, 12b, 10a', 10b', 12a', 12b' may also be adapted for coupling to electrical elements by the addition of mounting holes, posts or notches as may be selected by a person of ordinary skill in the art as desired.

Figure 7:
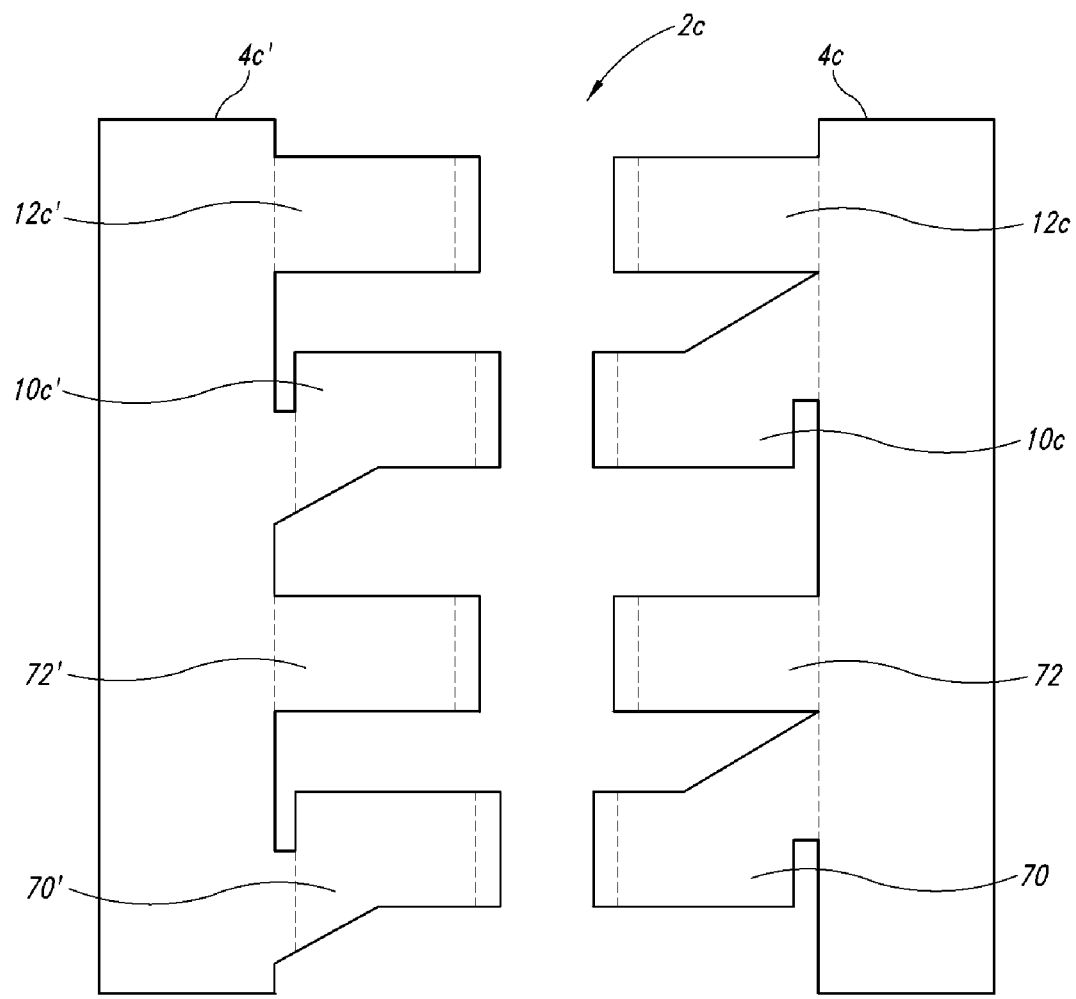
FIG. 7 is an exploded view of two bus bars for use in forming a bus bar assembly according to yet another illustrated embodiment.

FIG. 7 is an exploded view of a first bus bar 4c and second bus bar 4c' according to yet another illustrated embodiment of a bus bar assembly 2c. The positions of bends or angles to be formed in the first and the second bus bars 4b, 4b', are indicated by the vertically extending broken lines in FIG. 5. Each of the first and the second bus bar 4c, 4c' has a plurality of mounting arms. In particular, the first bus bar 4c has four mounting arms 10c, 12c, 70, 72 and the second bus bar 4' has four mounting arms 10c', 12c', 70', 72'. The plurality of pairs of mounting arms 10c, 12c, 70, 72, 10c', 12c', 70', 72' may accommodate a plurality of electrical circuit elements as desired for a particular application. Such may be particularly useful where, for example, an electrical circuit employs a bank of capacitors or other electric circuit elements.

Figure 8:
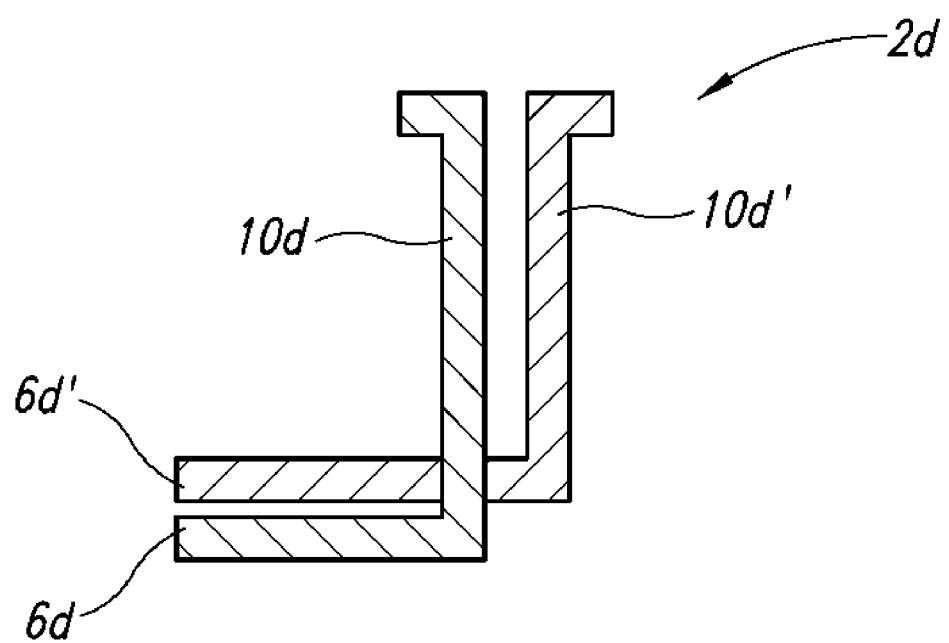
FIG. 8 is a cross-sectional view of a bus bar assembly according to still another illustrated embodiment.

FIG. 8 is a cross-sectional view of yet another embodiment of a bus bar assembly 2d, wherein the base 6d overlaps the base 6d' further reducing the magnetic flux resultant from the addition of the magnetic fields associated with currents in the bases 6d, 6d'. The other features of the embodiment depicted in FIG. 8 are as described with respect to FIGS. 2, 3A and 3B and are not repeated here in the interest of brevity and clarity. Alternatively, the other features of the embodiment depicted in FIG. 8 are as described with respect to FIGS. 5, 6A and 6B and are not repeated here in the interest of brevity and clarity.

Figure 9:
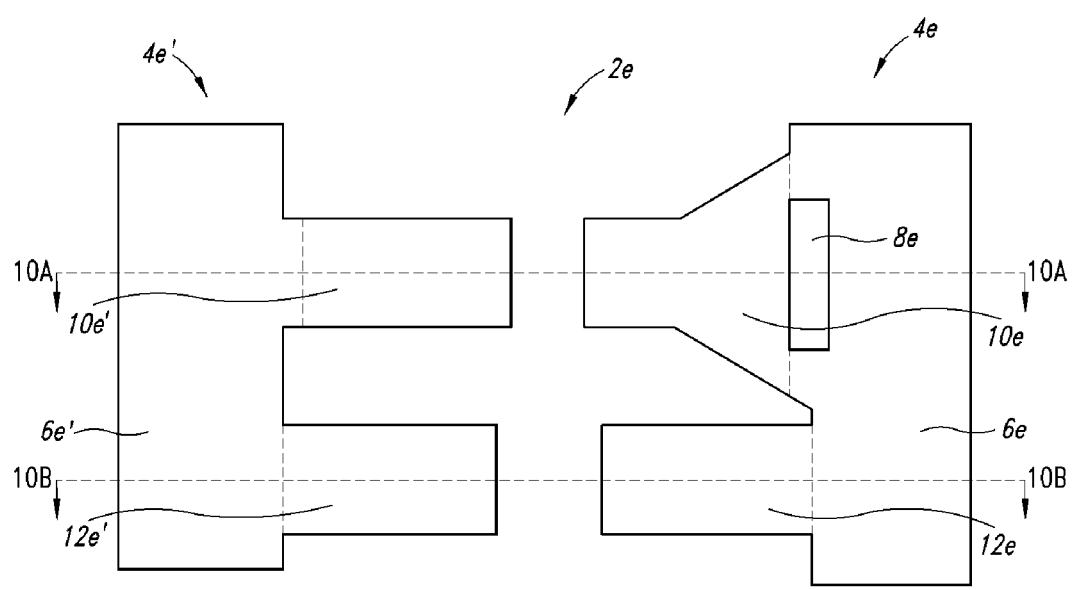
FIG. 9 is an exploded view showing two bus bars for use in forming a bus bar assembly, according to yet still another illustrated embodiment.

FIG. 9 is an exploded view showing two bus bars 4e, 4e' for use in forming a bus bar assembly 2e, according to yet still another illustrated embodiment. The bus bars bus bars 4e, 4e' are somewhat similar to those shown in FIG. 2, however the passage 8e is moved relatively away from the mounting arm 10e into the base 6e.

Figure 10A:
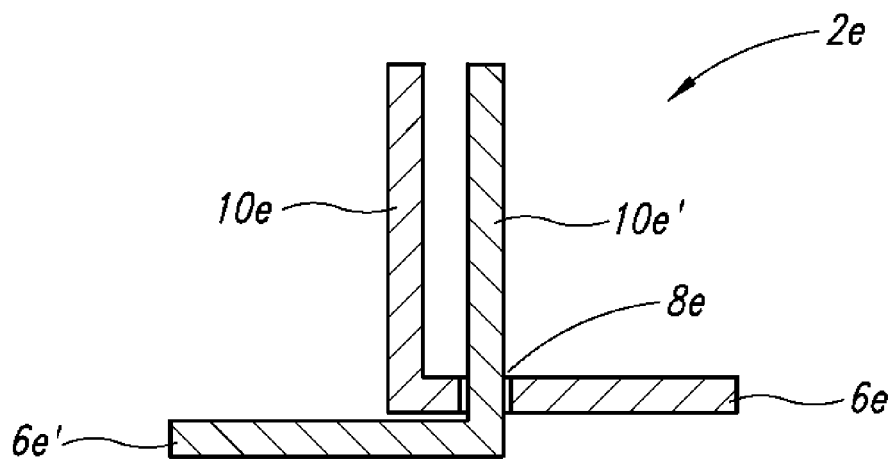
FIG. 10A is a cross-sectional view of a bus bar assembly formed from the two bus bars of FIG. 9 taken along line 10A-10A.
Figure 10B:
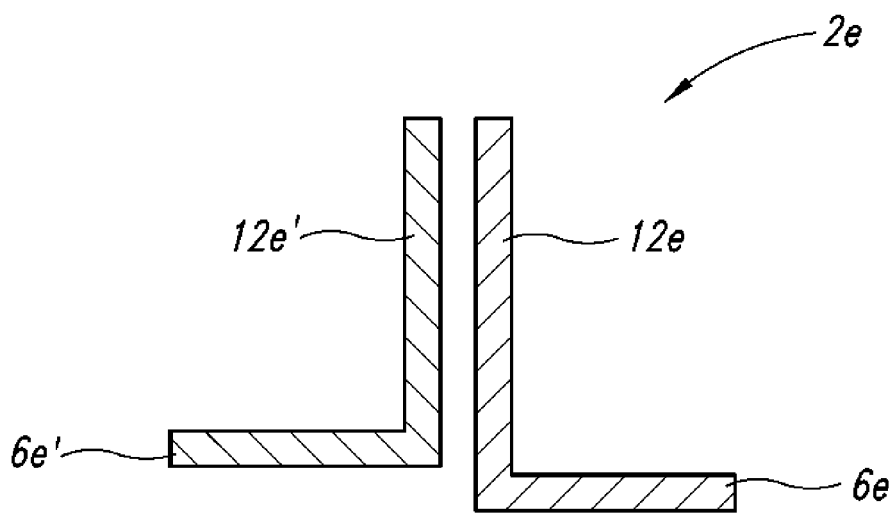
FIG. 10B is a cross-sectional view a bus bar assembly formed from the two bus bars of FIG. 9 taken along line 10B-10B.

FIG. 10A is a cross-sectional view of a bus bar assembly formed from the two bus bars of FIG. 9 taken along line 10A-10A. FIG. 10B is a cross-sectional view a bus bar assembly formed from the two bus bars of FIG. 9 taken along line 10B-10B. FIGS. 10A and 10B show that the bases 6e, 6e' of the bus bar assembly 2e are non-planar with respect to one another, in contrast to the embodiment of FIGS. 2, 3A and 3B. The mounting arm 10e' is received through the passage 8e, and does not make contact with either the base 6e or the mounting arm 10e, thereby avoiding any electrical short circuits.

The above description of illustrated embodiments, including what is described in the Abstract, is not intended to be exhaustive or to limit the embodiments to the precise forms disclosed. Although specific embodiments of and examples are described herein for illustrative purposes, various equivalent modifications can be made without departing from the spirit and scope of the disclosure, as will be recognized by those skilled in the relevant art. The teachings provided herein of the various embodiments can be applied to other bus bars and bus bar assemblies, not necessarily the exemplary bus bars and bus bar assemblies generally described above.

The various embodiments described above can be combined to provide further embodiments. Aspects of the embodiments can be modified, if necessary, to employ structure and concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

What is claimed is:

1. A bus bar assembly, comprising:
a first bus bar having a first mounting arm and a second mounting arm; and
a second bus bar having a third mounting arm and a fourth mounting arm;
wherein the first bus bar includes a notch adjacent to the first mounting arm that is adapted to receive the third mounting arm, and without contacting each other the first and third mounting arms are alternately interleaved with one another such that a position of the first mounting arm relative to the third mounting arm is opposite as to a position of the second mounting arm relative to the fourth mounting arm.

2. The bus bar assembly of claim 1 wherein the first bus bar has a passage adjacent to the first mounting arm, sized and dimensioned to receive the third mounting arm.

3. The bus bar assembly of claim 1 wherein the first bus bar has a first base and the second bus has a second base; where the first and second bases overlap.

4. The bus bar assembly of claim 1 wherein the first bus bar is electrically coupled to a first electrical potential that has a first electrical polarity and the second bus bar is coupled to a second electrical potential having that has a second electrical polarity.

5. The bus bar assembly of claim 4 wherein first electrical polarity is different from the second electrical polarity.

6. The bus bar assembly of claim 1 wherein the mounting arms are adapted to couple to electrical elements.

7. The bus bar assembly of claim 6 wherein the first and the fourth mounting arms are adapted to electrically couple to a first electrical element and the second and the third mounting arms are adapted to electrically couple to a second electrical element.

8. The bus bar assembly of claim 6 wherein the electrical elements are capacitors.

9. A bus bar assembly comprising:
a first bus bar including a first arm and a second arm extending transversely from a first body portion;
a second bus bar including a third arm and a fourth arm extending transversely from a second body portion;
wherein the first body portion includes a slot disposed adjacent the first arm of the bus bar, and the third arm of the second bus bar extends through the slot.

10. The assembly as recited in claim 9, wherein the first body portion overlaps a portion of the second body portion.

11. The assembly as recited in claim 9, wherein the first bus bar is electrically coupled to a first electrical potential that has a first electrical polarity and the second bus bar is coupled to a second electrical potential having that has a second electrical polarity.

12. A bus bar assembly comprising:
a first bus bar including a first arm and a second arm extending transversely from a first body portion;
a second bus bar including a third arm and a fourth arm extending transversely from a second body portion;
wherein the first body portion includes a notch adjacent the first arm of the bus bar, and the third arm fits within the notch without contacting the first bus bar.

* * * * *